A. G. PAUL.
HEATING SYSTEM.
APPLICATION FILED DEC. 23, 1895.
916,364.
Patented Mar. 23, 1909.
2 SHEETS—SHEET 1.
*Fig. 1,*
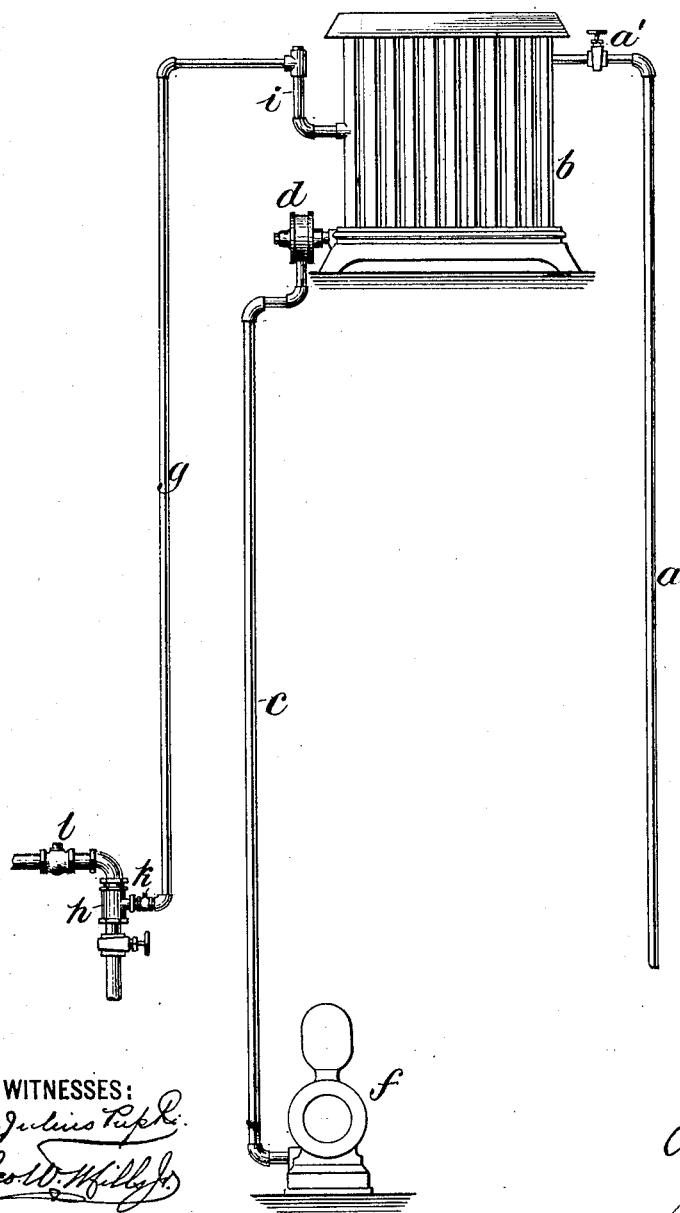
WITNESSES:
INVENTOR
Andrew G. Paul
BY
Witter & Kenyon
ATTORNEYS

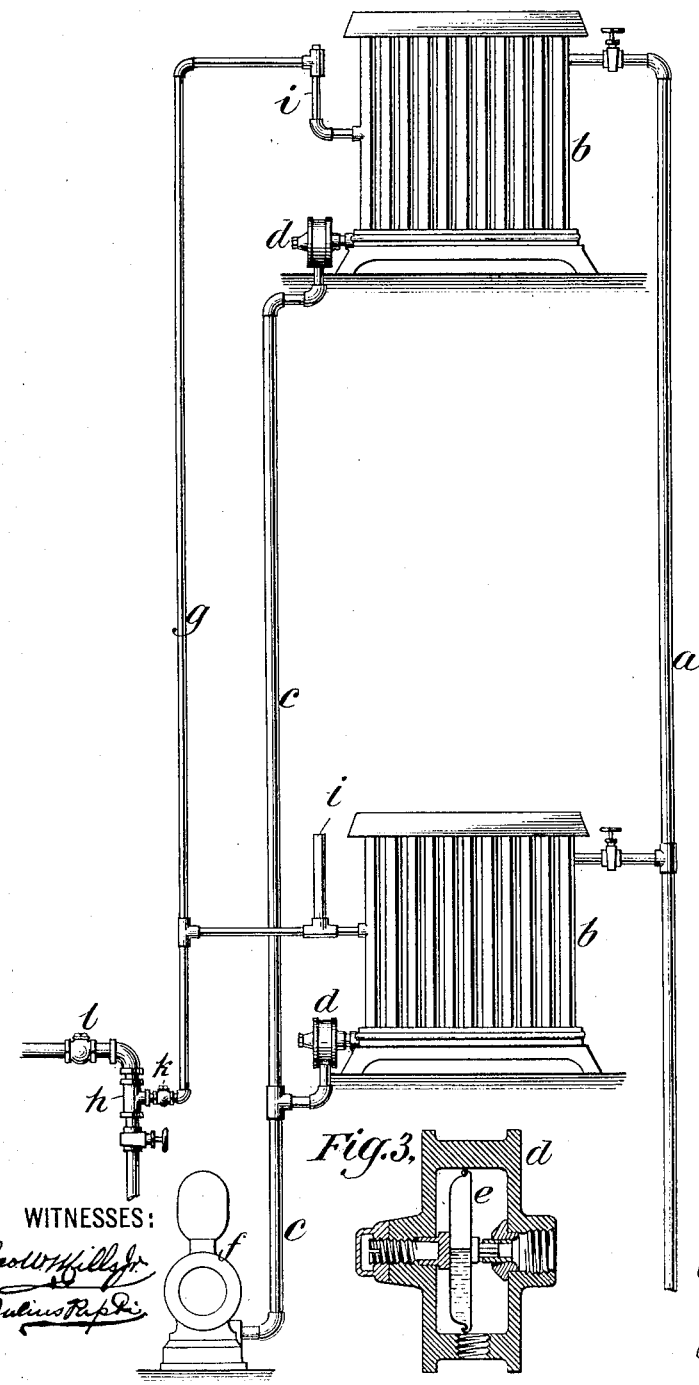

UNITED STATES PATENT OFFICE.

ANDREW G. PAUL, OF BOSTON, MASSACHUSETTS.

HEATING SYSTEM.

No. 916,364.  Specification of Letters Patent.  Patented March 23, 1909.

Application filed December 23, 1895. Serial No. 572,984.

*To all whom it may concern:*

Be it known that I, ANDREW G. PAUL, a citizen of the United States, and a resident of Boston, county of Suffolk, and State of Massachusetts, have invented a new and useful Improvement in Heating Systems, of which the following is a specification.

My invention relates to heating systems in which steam or other similar heating vehicle is caused to flow to the radiators or heaters through a suitable system of pipes, and to give off a portion of its heat in the radiators or heaters, and it is especially applicable to systems in which the whole or a part of the heating vehicle is condensed in the radiator or heater.

The object of my invention is to improve the movement of the heating vehicle in the system, and to remove the heating vehicle therefrom after it has given up its heat, as well as the air and other gases that may collect therein, and to do this in an efficient, reliable and economical manner.

My invention consists first in the combination with a radiator or heater and with the other necessary parts of the heating system, of a return or discharge pipe provided with means for automatically and intermittently causing a discharge of the heating vehicle through the discharge pipe, the said means being adapted to be operated by or in accordance with the conditions existing on the outlet side of said means, and an exhausting pipe with which the discharge pipe is connected.

My invention also consists in the combination with a radiator or heater and the other necessary parts of a heating system, of a return or discharge pipe provided with an automatic expansion trap or valve having its expanding member on the outlet side of the trap or valve and an exhausting device connected with the discharge pipe whereby the heating vehicle, when it has given up a certain portion of its heat, and has been reduced to or below a certain temperature, will cause the trap or valve to open and discharge some of the heating vehicle. When steam or a similar heating vehicle is employed, it will be discharged in the form of water of condensation, but my invention is also applicable to heating systems in which other forms of heating vehicle are employed, for example to hot water heating systems. As the expanding member of the valve is placed on the outlet side of the valve and the discharge pipe is connected with an exhausting device, the trap or valve will open and close automatically and intermittently. It will be operated by the heat given off by the heating vehicle in the discharge pipe beyond the valve, that is to say, by the temperature of the heating vehicle that is passing through the valve.

My invention also consists in certain novel features of construction and combinations of parts hereinafter described and claimed.

The accompanying figures fully illustrate my improvement.

Figure 1 shows a single radiator constructed and arranged according to my invention; Fig. 2 shows a system containing two radiators; Fig. 3 is a sectional view of my preferred form of trap.

Similar letters indicate similar parts in the different figures.

In Fig. 1 of the drawings *a* is the supply pipe which can be connected with any suitable source of supply, and is provided with a suitable valve *a'*. *b* is an ordinary radiator or heater. *c* is the return or discharge pipe. *d* is an automatic steam trap consisting of a valve device. The form of this trap can be greatly varied. The form I prefer is shown in section in Fig. 3; it is what is commonly known as an expansion trap. As the particular construction of this trap is well understood, and separately considered forms no part of my invention, I shall not describe it in detail, further than to say that when the vessel *e* is exposed to a certain degree of heat it will expand and close the valve, and when it is cooled again it will contract and open the valve. This vessel is ordinarily filled with some volatile liquid such as ether which, when heated, expands into gaseous form and extends the inclosing vessel. While, as already stated, the form of the trap can be greatly varied, it is essential, when an expansion trap is employed, that the expanding member, whatever may be its form, should be arranged in the manner clearly shown in the drawings, to wit, on the outlet side of the discharge valve. If the expanding member were placed on the inlet side of the valve and were thus exposed directly to the heat of the heating vehicle in the radiator, this heat would prevent the discharge valve from opening and closing intermittently. The position or location in which the expanding member is put can be greatly varied so long as it is placed where it will be affected or operated either directly or indirectly by the heat given off from the heating vehicle so as to intermittently open and close the valve; but in the best form of my invention the expanding member is placed in the discharge pipe on the outlet side of the discharge valve, as shown in Fig. 3. $f$ is an exhausting device of any suitable construction connected with the discharge pipe. $g$ is an air pipe which is additional to the supply and return pipes and which is connected with the radiator at any suitable point, preferably at the upper part thereof. $h$ is an exhauster of any suitable form connected with the air pipe. I prefer to employ a jet of steam or water. $i$ is an automatic air valve of well known construction which opens to permit the passage of air and gases, and closes to prevent the passage of the heating vehicle, this operation being due to the effect of heat and cold upon the said valve. $k$ is an ordinary check valve placed upon the air pipe between the exhauster and the system, that is to say, on the system side of the exhauster. $l$ is an ordinary check valve placed on the discharge pipe leading from the exhauster, that is to say, on the other side of the exhauster from the check valve $k$.

Assuming that steam is used as the heating vehicle, the operation of the device shown in Fig. 1 is as follows. The exhausters $f$ and $h$ are started and the valve in the supply pipe is opened. The air is caused to flow out quickly from the system through both the discharge pipe $c$ and the air pipe $g$, and the steam or other similar heating vehicle flows in and fills the radiator. When the steam reaches the steam trap $d$ the valve in the trap is closed by the heat imparted from the steam, and the escape or waste of any substantial quantity of steam at that point is prevented. When the steam reaches the automatic valve $i$ in the air pipe, that valve is likewise closed and the escape or waste of any substantial quantity of steam is prevented there also. When the valve $d$ in the discharge pipe is closed, as already explained, the exhauster $f$ continues to draw out from the discharge pipe, between the valve $d$ and the exhauster, the air and other contents of that pipe. The pressure in the discharge pipe is thereby reduced, and the temperature of the contents of that pipe, including the portion of the discharge pipe surrounding the expanding member $e$, is consequently lowered, this fall in temperature depending upon the extent to which the pressure is decreased in said pipe. The expanding member is thus cooled and the discharge valve $d$ is opened. As the steam is condensed in the radiator the water of condensation comes in contact with the steam trap. When the discharge valve opens in the manner just explained, a small quantity of the water will pass through the port of the valve and come into contact with the expanding member. If the temperature of this water is above the predetermined point, the valve will at once close again without permitting the escape of any substantial quantity of water. When the water in the radiator cools sufficiently to cause the valve in the trap to remain open, some of the water will be discharged, and this discharge will continue until the trap is again closed by contact with steam or with hotter portions of the water of condensation. The trap can be regulated so as not to discharge any substantial quantity of water until the water in the radiator has been substantially cooled or until it has fallen below a certain predetermined temperature. In this way the trap can be regulated so that practically only cool water will pass into the return or discharge pipe. The discharge pipe or valve is thus automatically and intermittently opened and closed. This is effected by the changes in the condition of the heating vehicle. In the form of my invention illustrated in the drawings, the discharge valve is controlled by the conditions existing in the discharge pipe on the outlet side of said valve, to wit, by the temperature of the heating vehicle that has passed through said valve and is on the outlet side of the same. It will be seen that, in the construction just described, the discharge valve will be opened and closed, not only intermittently, but at short intervals. As already explained, the amount of the discharge in each instance is regulated according to the temperature of the heating vehicle passing through the valve, and the accumulation of a large quantity of condensation in the radiator will be prevented. When any air collects in the radiator the automatic valve $i$ is cooled and thereby opened and the air escapes through the air pipe $g$. When the steam again comes into contact with the valve $i$ it is closed as before. The exhauster $f$ operates forcibly to cause a flow through the discharge pipe whenever the steam trap $d$ is opened, and the exhauster $h$ operates forcibly to cause a flow through the air pipe $g$ whenever the automatic valve $i$ is opened. The radiator is kept substantially free from air and sufficiently free from water, that is to say, only a certain amount of water is permitted to collect therein.

As a result of employing an expansion trap a special advantage is secured. The water is retained in the radiator until it has given up a much larger number of its heat units in effective work. This avoids the waste of heat which results where the water of condensation is allowed to run away in a hot state. Moreover, the lower the temperature of the water the easier it is to handle it.

When an expansion trap is employed my improvement is also especially applicable to systems in which hot water or a similar heating vehicle is used. As the water in the radiator gives up its heat its temperature is reduced; the cooler portions of the water sink to the lower part of the radiator and come in contact with the expansion trap. When this water is sufficiently reduced in temperature and the trap opens in the manner explained the water is discharged, the discharge continuing until the hotter portions of the water come in contact with the trap when the trap is again closed. In this way the circulation of the water is secured according to the condition of the water in the radiator. When it has given up such part of its heat as to be no longer serviceable for further heating, it is discharged from the radiator and a fresh quantity of the heating vehicle introduced.

It is manifest that that form of my invention which employs an expansion trap, includes in its broadest form any arrangement of the expanding member of the trap in which the temperature of the heating vehicle expands or contracts the expanding member of the trap, either directly or indirectly, that is to say, by actual contact of the heating vehicle with the expanding member or by contact of the heating vehicle with any intervening heat conveying medium which is in contact with the expanding member, whereby the discharge pipe or valve is opened and closed intermittently.

In Fig. 2 a heating system is shown comprising two radiators. Any number of radiators may be combined in the system. The supply pipe $a$ is provided with suitable branches, one connected with each radiator, and these branches may be provided with suitable valves. The discharge pipe $c$ also has branches connecting it with the several radiators. Each of these branches is provided with an automatic steam trap $d$. An exhausting device $f$ is connected with the common discharge pipe. The air pipe $g$ is in like manner provided with branches connecting with the several radiators. Each branch has an automatic air valve $i$. $h$ is an exhauster connected with the main or common part of the air pipe. $k$ and $l$ are check valves similar to those shown in Fig. 1. The operation of my invention when thus applied to several radiators is substantially the same as already set forth except that the exhausting device connected with the discharge pipe operates to discharge the water of condensation or the heating vehicle when cooled, from a number of radiators or heaters, and except that the exhausting device connected with the air pipe operates to remove the air and gases from a number of radiators or heaters.

When in this specification I refer to automatic means for opening and closing the discharge pipe or valve, I do not include under that term an expansion valve or trap in which the expanding member is placed in the inlet side of the valve, as an expanding member so arranged will not operate to open and close the valve intermittently, as experience has fully demonstrated.

When my entire invention is employed great economy and efficiency of operation are secured. The obstacles to a free and complete movement and distribution of the heating vehicle in the radiators or heaters, namely, air and gases and water of condensation or water of a low temperature, are entirely and quickly removed, and the heating vehicle is caused to flow into the radiators or heaters as a result of its own condensation, or as a result of its reduction in temperature changing its condition from that of a serviceable heating agent to that of a useless obstruction. The heating vehicle is not sucked through the radiators and discharge pipe and thereby wasted, as in some former systems, but is substantially all retained in the radiators so long as it remains in the form of a heating agent, and is only removed when it has substantially lost its available or useful heat. When steam is used no substantial quantity of steam is sucked into the discharge pipe; nothing but the water of condensation escapes through that pipe, except at the beginning of the operation when air is also removed through this channel. When hot water is used, no substantial quantity of hot water is sucked into the discharge pipe, substantially nothing but the cool water which has given up its available and useful heat escapes therethrough, except such air as is removed at the beginning.

Another advantage of my improvement is that the short-circuiting of the heating vehicle through the nearest radiators is prevented. The trap in the discharge pipe prevents the heating vehicle from flowing into that pipe as already explained, and thereby prevents a current from being established through the nearest radiators which might cause all or substantially all of the heating vehicle to flow through those radiators and their discharge pipes and thus keep the proper supply from passing to the other radiators.

When my complete invention is employed so that the action of the automatic means in opening and closing the discharge valve is controlled by the conditions existing in the discharge pipe beyond said valve, the operation of the device can be very nicely regulated and adjusted by regulating or controlling the conditions in the discharge pipe by means of the exhausting device.

By the use of my invention the air, gases and water of condensation are quickly and reliably and intermittently removed from the system. The radiators or heaters are made to work at their full capacity when required, and without any substantial waste or loss of heat. These results are secured without employing high pressure in the radiators or on the supply side of the system.

I do not herein claim the combination, with the other elements described and claimed herein, of separate means such as a separate air pipe for discharging air from the system as I have reserved such claims for a separate application.

What I claim as new and desire to secure by Letters Patent is:—

1. In a heating system, the combination of a radiator, a supply pipe, a discharge pipe for the discharge of the heating vehicle, means for automatically and intermittently causing a discharge of the heating vehicle through the discharge pipe, and adapted to be operated by changes in temperature on the outlet side of said means, and an exhausting device with which the discharge pipe is connected, substantially as set forth.

2. In a heating system, the combination of a radiator, a supply pipe, a discharge pipe for the discharge of the heating vehicle, means for automatically and intermittently causing a discharge of the heating vehicle through the discharge pipe, according to the changes in temperature in the discharge pipe beyond said means, and an exhausting device with which the discharge pipe is connected, substantially as set forth.

3. In a heating system, the combination of a radiator, a supply pipe, a discharge pipe for the discharge of the heating vehicle, a discharge valve, and automatic means for intermittently operating said valve according to the changes in temperature in the discharge pipe beyond said valve, and an exhausting device with which the discharge pipe is connected, substantially as set forth.

4. The combination in a heating system of the supply pipe $a$, the radiator $b$, a discharge pipe $c$, automatic trap $d$, having its expanding member on the opposite side of the valve and valve seat from the radiator, and the exhausting device $f$, substantially as set forth.

5. In a heating system, the combination of a radiator, a supply pipe, a discharge pipe for the discharge of the heating vehicle, a valve in said discharge pipe, an expanding member located in the discharge pipe on the outlet side of the discharge valve for intermittently and at short intervals opening said valve and for regulating the amount of discharge according to the temperature of the heating vehicle passing through the valve, and an exhausting device connected with the discharge pipe on the discharge side beyond said expanding member.

In testimony whereof, I have signed my name to this specification, in the presence of two subscribing witnesses.

ANDREW G. PAUL.

Witnesses:
E. A. JAMES,
HERBERT A. RHOADES.